UNITED STATES PATENT OFFICE.

NIELS C. CHRISTENSEN, OF SALT LAKE CITY, UTAH, ASSIGNOR TO THE CONSOLIDATED MINING AND SMELTING COMPANY OF CANADA, LIMITED, OF MONTREAL, CANADA, A CORPORATION OF CANADA.

PROCESS OF TREATING ORES CONTAINING GALENA.

No Drawing.  Application filed September 30, 1919. Serial No. 327,401.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Ores Containing Galena, of which the following is a specification.

This invention relates to the treatment of ores containing galena for the recovery of the lead and silver therefrom. My process is applicable to all galena ores which do not contain too much readily soluble material such as calcite. It recovers practically all the lead and silver in the galena and also the silver not held by the galena if it is in the form of sulphide or antimonide. The sulphur of the galena is also recovered in a form which is readily handled.

My process consists in treating the finely ground galena with a concentrated salt solution containing ferric chloride. I have found that a relatively concentrated solution of sodium chloride or calcium chloride containing ferric chloride acts on the galena, dissolving the lead and silver and freeing the sulphur. The cold solution acts slowly and holds a comparatively small amount of lead but a hot solution acts very rapidly and holds a relatively large amount of lead. The lead and silver go into solution as chlorides and the sulphur is separated as free sulphur. The reaction is indicated below:

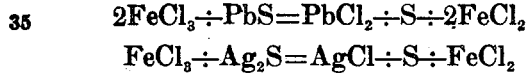

As shown by the above equations, in dissolving the lead (and silver) the ferric chloride is reduced to ferrous chloride. This ferrous chloride must be changed to ferric chloride again before the solution can be used for the treatment of more ore. This is best done by the addition of chlorine as shown:

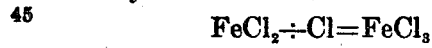

I bring about this change from ferrous to ferric iron by electrolyzing the lead chloride to secure lead and chlorine, and using this chlorine to change the iron from ferrous to ferric chloride. This may be done by electrolyzing the molten $PbCl_2$ and passing the chlorine into the ferrous chloride solution or by electrolyzing the $PbCl_2$ in the salt solution, the ferrous iron being changed to ferric at the anode. This operation should preferably be carried out in a cell with a diaphragm between the anode and cathode compartments to prevent the reduction of the ferric iron to the ferrous condition at the cathode. The lead chloride is added to the cathode compartment and the ferrous chloride solution to the anode compartment and the lead removed as lead sponge and the ferrous solution changed to ferric.

Either ferric chloride or ferric sulphate may be used as the ferric sulphate is changed to the chloride in the salt solution.

The hot salt solution holds a great deal more lead in solution than the cold solution, and in my preferred method of treatment I take advantage of this to separate the lead chloride from solution, the ore being treated with a hot solution to dissolve the galena, and this hot solution then separated from the ore and cooled, and the precipitated lead chloride separated from the cold solution. The difference in solubility of the lead chloride in the hot and cold solution is indicated by the curve in my patent application No. 327,400 also on the treatment of galena ores.

My preferred method of carrying out my process is as follows: The comminuted ore is agitated for from a short time (from 10–30 minutes or more according to the fineness of grinding, etc.) with hot salt solution containing a little excess of ferric chloride. I have also found it advantageous to use a small amount of acid with the ferric chloride in order to reduce the hydrolysis of the ferric chloride. This treatment brings the lead (and silver) into solution. This hot pregnant solution is then separated from the ore (preferably by filtration) and cooled and the precipitated lead chloride separated from the cold solution. This lead chloride is then electrolyzed and the chlorine used to convert the ferrous into ferric iron so that the solution may be used for the treatment of more ore. This electrolysis may be carried out by melting the $PbCl_2$ and electrolyzing it, giving melted lead and chlorine. The chlorine is then absorbed by the ferrous salt solution in any suitable absorption apparatus. It is advantageous to have some salt present with the molten lead chloride in order to reduce the melting point and lower the resistance of the molten bath.

The lead chloride may also be electrolyzed in a concentrated salt solution, the lead being precipitated as a sponge and the chlorine changing the ferrous iron to ferric at the anode. The electrolysis should preferably be conducted in a cell with a diaphragm to prevent the reduction of the ferric chloride at the cathode. A comparatively low E. M. F. may be used in this electrolysis as the reactions at the anode give back a considerable portion of the energy used at the cathode. Theoretically the voltage should be approximately one-half volt, but this cannot of course be realized in practice due to the resistance of the solution and diaphragm. My preferred method of carrying out the electrolysis in the solution is to electrolyze the warm solution containing the lead in a cell with a porous diaphragm. The pregnant solution is allowed to flow into the cathode compartment where the lead is deposited, and then into the anode compartment where the ferrous chloride is changed to ferric chloride and the ferric solution then used to treat more galena ore.

From the foregoing it will be apparent that the process is subject to many variations in the details of the manner of its application, but that the main features of the process are, first, the dissolving of the galena in a hot salt solution containing ferric chloride whereby the ferric chloride is reduced to ferrous chloride, and second, the electrolysis of the lead chloride to get lead and chlorine and the use of this chlorine to convert the ferrous chloride to ferric chloride so that the latter may be used in the treatment of more ore.

By my process it is possible to make a practically complete recovery of the lead and sulphur and silver and gold, and in many cases the copper, from galena ores. In the process the silver and gold is preferably precipitated, first, with copper, the copper with lead, and the lead by one of the methods previously described. In most ores all the gold and silver and copper, except that which is locked up in the pyrite or chalcopyrite which is present in the ore are easily recovered by my process.

As before mentioned the many variations in the details of methods of application of the process are too numerous to be given in the scope of a patent application, and I do not therefore desire to be limited by the brief descriptions given, but by the appended claims.

Having described my process what I claim and desire to patent is:

1. The process of treating ores containing galena which consists in treating said ores with a relatively concentrated salt solution containing ferric chloride, and thereby dissolving the lead as a chloride in said salt solution.

2. The process of treating ores containing galena which consists in treating said ores with a hot concentrated salt solution containing ferric chloride and thereby dissolving the lead as a chloride in said solution.

3. The process of treating ores containing galena which consists in treating said ores with a relatively concentrated salt solution containing ferric chloride, and thereby dissolving the lead as a chloride, and separating said salt solution containing the lead from the ore, and precipitating lead chloride from said solution.

4. The process of treating ore containing galena which consists in treating said ores with a concentrated salt solution containing ferric chloride and thereby dissolving the lead as a chloride and reducing the iron to the ferrous condition, and subjecting the lead chloride to electrolysis, and thereby securing metallic lead and chlorine and using said chlorine to change ferrous salts produced in said treatment to the ferric condition, and using said ferric solution for the treatment of more ore.

5. The process of treating ores containing galena which consists in treating said ores with a hot concentrated salt solution containing ferric chloride and thereby dissolving the lead as a chloride and reducing the iron to the ferrous condition and separating said solution containing the lead chloride and ferrous iron from the ore and electrolyzing said solution and thereby securing metallic lead and chlorine and using said chlorine to change the ferrous iron produced in the solution by above said treatment, to the ferric condition and using said ferric solution for the treatment of more ore.

6. The process of making lead chloride from galena which consists in treating said galena with a hot concentrated solution of salt containing ferric chloride and thereby dissolving the lead as a chloride; separating said pregnant solution from the residue of ore and cooling said solution and thereby precipitating lead chloride from said solution, and separating said lead chloride from the cold solution.

7. The process of treating galena for the recovery of the sulphur therefrom which consists in treating said ores with a hot concentrated solution of salt containing ferric chloride, whereby the lead is dissolved as a chloride and the sulphur freed as free sulphur, and separating said free sulphur from the remainder of the pulp.

8. The process of making lead from galena which consists in treating said galena with a hot concentrated salt solution containing ferric chloride whereby the lead is dissolved as a chloride and the ferric iron reduced to the ferrous condition, separating said solution containing the lead from the residue of the ore and cooling said solution and thereby precipitating lead chloride, separating said lead chloride from said solution, and electrolyzing said lead chloride, whereby the lead and chlorine are separated and using said chlorine to change ferrous iron in the solutions from the foregoing treatment to the ferric condition and using said ferric solution for the treatment of more galena.

9. The process of separating the sulphur from galena which consists in treating said galena with a hot concentrated solution of salt containing ferric chloride whereby the lead is dissolved as a chloride and the sulphur separated as free sulphur, separating said sulphur from the remainder of the pulp, separating the solution containing lead chloride from the remainder of the ore and electrolyzing the lead chloride, and thereby securing metallic lead and chlorine, and using said chlorine to change the ferrous iron made in the salt solution by foregoing treatment to the ferric condition, and using said ferric solution for the treatment of more galena.

10. The process of treating ores containing galena which consists in treating said ores with a relatively concentrated salt solution containing a ferric salt in solution, and thereby dissolving the lead as a chloride in said salt solution.

11. The process of treating ores containing galena which consists in treating said ores with a hot concentrated salt solution containing a ferric salt in solution and thereby dissolving the lead as a chloride in said solution.

12. The process of making lead chloride from galena which consists in treating said galena with a hot concentrated solution of salt containing a ferric salt in solution, and thereby dissolving the lead as a chloride; separating said pregnant solution from the residue of ore, and cooling said solution and thereby precipitating lead chloride from said solution, and separating said lead chloride from the cold solution.

13. The process of treating galena for the recovery of the sulphur therefrom which consists in treating said ores with a hot concentrated solution of salt containing a ferric salt in solution, whereby the lead is dissolved as a chloride and the sulphur freed as free sulphur, and separating said free sulphur from the remainder of the pulp.

14. A process for the extraction of lead from sulphide ores, which includes the leaching of the ore with ferric chloride in the presence of sodium chloride to dissolve the lead sulphide, and electrolyzing the solution to deposit the lead with simultaneous regeneration of the ferric chloride.

15. A process for the extraction of lead from sulphide ores, which consists of grinding the ore in a neutral brine, leaching it with ferric chloride in the presence of sodium chloride to dissolve the lead sulphide, and electrolyzing the solution to deposit the lead with simultaneous regeneration of the ferric chloride.

16. A process for the extraction of lead from sulphide ores which includes the treating of the ore with ferric chloride in the presence of sodium chloride to dissolve the lead sulphide, electrolyzing the solution to deposit the lead with simultaneous regeneration of the ferric chloride and recovering the chlorine liberated during the electrolysis as ferric chloride.

In testimony whereof I have signed my name to this specification.

NIELS C. CHRISTENSEN.